United States Patent Office 3,734,918
Patented May 22, 1973

3,734,918
WOOD ADHESIVE
Johann Mayer and Christof Schmidt-Hellerau, Ludwigshafen, Germany, assignors to Badische Anilin- & Soda-Fabrik Aktiengesellschaft, Ludwigshafen (Rhine), Germany
No Drawing. Filed Apr. 23, 1971, Ser. No. 137,030
Claims priority, application Germany, Apr. 27, 1970,
P 20 20 481.3; Sept. 2, 1970, P 20 43 440.6
Int. Cl. C08g 37/18, 51/24
U.S. Cl. 260—29.3                                    8 Claims

ABSTRACT OF THE DISCLOSURE

A process for the production of an aminoplast adhesive resin for the preparation of weatherproof adhesive joints in which melamine urea, and a small amount of phenol are condensed with formaldehyde in a definite sequence.

---

The invention relates to a new type of aminoplastic binder for weatherproof wood gluing.

Aminoplast adhesive resins have great importance as binders in the wood industry because they are readily accessible and simple to process and moreover behave substantially indifferently towards wood, i.e. cellulose.

Most wood adhesives, now as before, are urea resins whose properties are satisfactory for many purposes. Melamine resins are increasingly used to meet higher requirements as to bond strength and resistance to moisture. Since melamine is prepared as a rule from urea, melamine resins, as compared with urea resins, are used more for special purposes; for example, melamine resins have come to be used for the surface treatment of materials, in some cases in the form of cocondensates with urea.

Peculiarly however even melamine-based aminoplast resins which give joints that are considered to be permanent against boiling are not suitable for preparing weatherproof adhesive joints. Weatherproofness has hitherto only been achieved with phenolic resins capable of alkaline cure but these (a) are known to give joints of dark color and (b) may damage wood under the conditions of the cure. The relationship between adhesive material, processing technique and resistance to weathering of the product obtained is but little known and appears to depend on the interaction between adhesive and wood. In any case weatherproofness cannot be achieved by gluing with mixtures of aminoplast resins and phenolic resins. The general statements occasionally made in the literature that aminoplasts and phenoplasts may be used mixed mixed with one another or in the form of cocondensates therefore do not provide any useful information as far as weatherproof adhesive joints are concerned.

It is an object of the invention to provide an aminoplast resin which can be prepared cheaply (i.e. which may contain a major amount of inexpensive urea) and which makes it possible to bond parts of wood or wood-like materials together in such a way that the adhesive joint formed is resistant to boiling and in particular to weathering.

Another object of the invention is to provide an aminoplast resin for the preparation of weatherproof joints which resin can be processed cold.

Surprisingly it is possible to prepare wood adhesives which give weatherproof joints and which are curable cold by reacting an aqueous melamine resin, which may be diluted with up to 600 mol percent of urea, under alkaline conditions with a minor proportion of phenol, advantageously in the presence of formaldehyde or a methylol compound of melamine. When the reaction with phenol is carried out in the presence of a methylolmelamine, a pure urea resin is also suitable as condensate.

According to the invention therefore a process for the production of a wood adhesive which contains 1.7 to 3.0 mols of formaldehyde and 0.05 to 0.2 mol of a phenol for each mol of melamine or a mixture of at least 15 mol percent of melamine and up to 85 mol percent of urea comprises condensinfi 1 mol of melamine and/or urea and 1.5 to 2.5 mols of formaldehyde in aqueous solution up to a water compatibility of 0.5 to 10 and reacting the condensate at a pH of 7.5 to 10 and at from 45° to 100° C. with 0.05 to 0.2 mol of a phenol, with or without up to 0.5 mol of formaldehyde and with or without up to to 0.5 mol of melamine, until the aqueous solution has reached a viscosity of from 300 to 2000 centipoises measured at a solids content of 63% and at 20° C.

As a rule a higher melamine content calls for a higher formaldehyde content.

It is known that aminoplast-forming compounds and phenols will form cocondensates with formaldehyde in any proportions; this knowledge has however never found practical use.

A resin according to the invention may be obtained for example by first condensing urea and formaldehyde at pH 3 to 6.5, particularly at pH 4 to 5, and at 80° to 100° C. so that a conventional (and commercial) aqueous urea adhesive resin is obtained and further condensing up to the said viscosity at pH 7.5 to 10, advantageously at pH 8 to 9 and particularly advantageously at pH 8.2 to 8.7 with the addition of a phenol, formaldehyde and melamine (the melamine if desired in the form of a precondensate with formaldehyde).

On the other hand, melamine may be condensed alone or with urea in the first condensation stage; this is advantageously done however in the alkaline range, i.e. at pH 7.5 to 10, particularly at pH 7.5 to 9. A melamine resin or a urea-melamine resin is obtained which is further condensed with a phenol and formaldehyde, if desired together with a residual amount of melamine, until the desired viscosity has been achieved.

The phenol used is advantageously hydroxybenzene (phenol itself), but resorcinol, the cresols or xylenols or commercial mixtures of these substance are also suitable and give excellent adhesive resins.

Condensation may be carried out by a conventional method, for example by mixing the reactants with commercial-grade formaldehyde solution, seting up a suitable pH and heating. The reaction proceeds exothermally and may be carried out with the usual industrial means, for example batchwise in stirred vessels or semicontinuously or continuously in cascades of stirred vessels or in tubular reactors. The course of reaction of the mixtures may be recognized not only by the abovementioned criteria of dilutability with water and viscosity, but obviously also by equivalent parameters characterizing the course of a reaction such as content of free formaldehyde, displacement of pH or consumption of alkali or acid, the amount of heat evolved, and the viscosity at the reaction temperature after appropriate calibration.

Water dilutability (also known as water compatibility) is used by those skilled in the art as an empirical measure of the degree of condensation of a formaldehyde resin. It is defined as the maximum relative amount of water which can be added to the resin solution at room temperature (for example 20° C.) without the mixture separating into its components. A lower dilutability indicates a higher degree of condensation. Separation of polymers and "inferior" solvents in dependence on the degree of polymerization and the temperature is known from handbooks of macromolecular chemistry.

In accordance with the invention, water dilutability at the end of the first reaction stage should be as low as possible, i.e. at about 0.5 to 10, particularly from 1.5 to 2.5, and is already usual in commercial aminoplast glue resins.

The lower water diluabilities (i.e. the higher degrees of condensation) generally mean an advantage; they are merely limited by practical considerations, for example problems met with in cleaning the reaction plant, namely the clogging up of the plants when they are cleaned with water.

The end point of the second stage of the reaction may be recognized according to the invention by the viscosity of the resin solution. A 63% solution should have a viscosity of from 300 to 2000, advantageously from 700 to 900, centipoises, measured at 20° C. at the end of the reaction.

Viscosity is also a measure of the degree of condensation of the resin and is naturally dependent on the concentration of the solution. A resin solution according to the invention, such as is obtained at the end of the second stage of the reaction, may obviously have a solids content other than 63%, for example one of from 40% to 70%. By appropriate calibration however the viscosity range of a 63% solution may easily be transposed to other resin concentration. For example if a 63% solution having a viscosity of 800 centipoises is diluted to a solids content of 58%, the viscosity falls to about 380 centipoises and it rises to about 1800 centipoises when the solution is brought to a content of 68%.

Adhesive resins according to the invention may be processed in the conventional manner; for example a modifying agent may be added which prolongs keeping qualities, which provides protection against attack by termites or fungus, which provides water repellency or which serves some other purpose. The resin may be converted into a soluble dry powder, by a conventional method, e.g. by spraying.

In particular the curing of the resin in the presence of the wood adherends may be carried out by a conventional method, for example by the catalytic action of ammonium chloride or the like, especially with the simultaneous action of heat or superheated steam. When modern wood base materials such as chipboards are to be prepared, it is preferred to use slightly diluted resin solutions which have low viscosity and are therefore sprayable.

Surprisingly the new type of wood adhesive is not only suitable for weatherproof hot gluing but also for joint-filling cold gluing giving joints which are resistant to boiling water and weather, particularly in the field of wood construction, when formic acid is used as curing agent.

An extender, advantageously powdered coconut shells, may additionally be contained in the wood adhesive for further improving its joint-filling properties.

The use of acids or substances which can liberate acids (as for example ammonium chloride) as curing agents for aminoplasts is known, but surprisingly among many conventional industrial acids investigated only formic acid has proved to be an adequately suitable curing agent for weatherproof cold gluing with the wood adhesives the present invention, because stringent requirements have to be placed on a weatherproof cold glue especially in wood construction. Moreover aminoplast glues have not hitherto been used for weatherproof cold gluing.

The cold-curing ready-for-use adhesive containing adhesive resin and formic acid as curing agent can be obtained by a conventional method by bringing together adhesive resin solution and formic acid which may also be in the form of a dilute solution. It is particularly advantageous to use the wood adhesive with formic acid by application of a mixture of the two substances, in contrast to the other known method of separate application. The adhesive and the hardener are mixed and the gluing by means of the curing mixture is carried out forthwith, i.e. within the pot life, also referred to as work life, of the mixture. Since this method forms part of the prior art no protection is claimed for the manner of carrying out the gluing process and the method is not described in greater detail.

It is advisable however to maintain approximately the following relative proportions of adhesive, hardener and any extender used: for each 100 parts by weight of the said adhesive resin solution having a solids content of from 58 to 63% there are used for example from 1 to 8 parts by weight of formic acid, which may be in the form of, for example, 30 to 85% aqueous solution, and 10 to 20 parts by weight of any extender used. The work lives of the mixtures obtained, for example of from thirty to three hundred minutes, can be accurately adapted to the problems at hand by appropriate experiments. In addition to the said powdered coconut shell, the filler may be for example sawdust, cured and ground phenoplasts or aminoplasts, or small amounts of powdered grain or legumes.

It is also possible to use for example suitable wood preservatives such as fungicides or insecticides, marking dyes, thickeners and the like.

The following examples illustrate the invention. The percentages referred to in the examples relate to weight as they do in the foregoing description.

EXAMPLE 1

960 g. of a commercial aqueous urea-formaldehyde adhesive resin (having a molar ratio of urea to formaldehyde of 1:1.8, a water compatibility of from 1.5 to 2.5 and a solids content of about 65%) is condensed with 255 g. of melamine, 456.6 of a 40% formaldehyde solution and 91.4 g. of phenol at 90° C., the pH of the solution being kept constant at 8.5 by adding a total of 638 g. of a 25% aqueous solution of sodium hydroxide, until the viscosity of the resin solution has reached a value of 700 centipoises at 20° C. This is the case after about sixty minutes. The pH is advantageously monitored by measuring with a suitable glass electrode or by testing samples by the spot method with bromothymol blue as indicator.

EXAMPLE 2

200 g. of water and 960 g. of a urea-formaldehyde adhesive resin of the composition specified in Example 1 are condensed with 400 g. of a powdered melamine-formaldehyde resin containing melamine and formaldehyde in the molar ratio 1:2, and 91.4 g. of phenol at 90° C. at a constant pH of 8.5 (by adding caustic soda solution) until the resin solution obtained has a viscosity of 700 to 1000 centipoises at 20° C.

The resin solutions obtained according to Examples 1 and 2 have a solids content of about 63% and have a pot life of several weeks when kept at room temperature.

EXAMPLE 3

960 g. of an aqueous melamine-formaldehyde adhesive resin (molar ratio of melamine to formaldehyde 1:2) which has been condensed under alkaline conditions to a water compatibility of 2.0 and which has a solids content of 60% is reacted under the reaction conditions described in Example 1 with 92 g. of phenol. The viscosity finally achieved is 400 centipoises.

Test results and comparison

Using the resins obtained according to Examples 1 and 2 and a urea-melamine resin devoid of phenol (comparison A) having a molar ratio of urea:melamine:formaldehyde of 1:0.35:2.9 and a pure melamine resin (comparison B) having a molar ratio of melamine:formaldehyde of 1:3 with which 12% of resorcinol has been mixed subsequently, chipboards having a thickness of 18.3 mm. are prepared from softwood chips in each case with 11% (comparison B: 8%) of resin (dry with reference to dry chips) at a pressure of 20 atmospheres for six minutes at a temperature of 160° C. in a test press and tested according to the provisions of DIN 68761. The results are given in the following Table 1. As far as the results of outdoor weathering are concerned, for lack of a suitable test specification the tensile strength of the top stratum of a fresh board is compared with that of a board which has been kept in the open for twenty-four months inclined at an angle of 45° to the south.

The values given are mean values of thirty to one hundred samples.

As may be seen from Table 1, the modification of the aminoplast resin with phenol according to the invention also improves the technological values in immediate tests.

In the Table 1, E=Example and CT=comparative test. The values marked + had not been determined at the time of the filing of the German application.

TABLE 1

| Measured value | E1 | E2 | CTA | CTB (8% resin) |
|---|---|---|---|---|
| Thickness of board, mm | 18.3 | 18.2 | 18.3 | 18.0 |
| Density, p./cm.$^3$ | 0.642 | 0.643 | 0.648 | 0.707 |
| Flexural strength (kp./cm.$^2$) according to DIN 52365 | 301 | 312 | 280.6 | 259 |
| Transverse tensile strength V20 (kp./cm.$^2$) according to DIN 52365 | 13.37 | 9.73 | 8.43 | 9.7 |
| Transverse tensile strength V 100 (kp./cm.$^2$) according to DIN 52365 | 5.18 | 4.96 | 2.78 | 2.1 |
| Swelling in thickness after two hours according to DIN 52364, percent | 2.75 | 3.34 | 6.84 | 4.1 |
| Swelling in thickness after 24 hours according to DIN 52364, percent | 7.77 | 9.53 | 12.13 | 10.8 |
| Water absorption (percent) in 2 hours according to DIN 52361 | 11.89 | 13.45 | 15.30 | -------- |
| Tensile strength top stratum in, kp./cm.$^2$: | | | | |
| Immediately | 16.9 | + | + | 11.9 |
| After weathering for 24 months in the open | 8.3 | + | + | $^1$ 5.1 |

$^1$ 12 months.

EXAMPLE 4

0.15 kg. of coconut shell powder (currently obtainable under the trade name "Vavanite") and 30 g. of a 34% aqueous solution of formic acid are mixed with 1 kg. of a 59% aqueous solution of an adhesive resin prepared by condensation of melamine, urea, phenol and formaldehyde in the molar ratio 1:3.2:0.6:10 in the case of resin (I) and 1:1.8:0.4:7.2 in the case of resin (II) and condensed to a viscosity of 600 centipoises, and used for gluing. The period of time between application of adhesive to the adherends and contacting the adherends (hereinafter referred to as "open time") and the period of time between contacting and pressure application (hereinafter referred to as "closed time") total from 10 to 75 minutes.

The test specimens are small boards or spruce and beech having the dimensions 30 cm. x 14 cm. x 0.5 cm., the adhesive joint having a thickness of 1 mm. Measurement of the bond strength and the amount of wood torn out is carried out according to DIN 53254 in the dry condition, after lying in water at 20° C. for ninety-six hours and testing for resistance to boiling is carried out according to the standard specification AW 100 of DIN 68705. The results are given in Table 2, each measured value given being the mean value of thirty samples.

TABLE 2

[Cold gluing of small beech boards having a thick glue joint (1 mm.), the bonded boards being left for thirty minutes in the open at 24° C.]

| Measured value | Resin (I) | Resin (II) |
|---|---|---|
| Tensile strength (bond strength) dry in, kp./cm.$^2$ | 75.80 | 77.63 |
| Wood torn out, percent | 87 | 76 |
| Tensile strength after laying in water at 20° C. for ninety-six hours | 58.11 | 67.05 |
| Wood torn out, percent | 99 | 98 |
| Tensile strength (according to (AW 100) (alternate boil test)) | 50.85 | 55.25 |
| Wood torn out, percent | 77 | 55 |

It is evident from the table that the degree of condensation of the wood glue plays some part in cold gluing. Examples of glues which are particularly recommended as cold glues are those whose degree of condensation is characterized by a viscosity of the 59% solution of from 500 to 800 centipoises at 20° C.

EXAMPLE 5

Comparative gluing tests are carried out on two different kinds of wood with the resin (I) described in Example 4. The glue used contains 30 g. of 34% formic acid and 200 g. of powdered coconut shell per 1 kg. of resin (I). The measured values given in Table 3 are mean values of thirty individual measurements, as described above.

TABLE 3

[Cold gluing of small boards with a thick glue joint (1 mm.) which are left in the open for fifteen minutes at 20° C.]

| Measured value | Beech | Spruce |
|---|---|---|
| Tensile strength dry, kp./cm.$^2$ | 80.90 | 63.20 |
| Wood torn out, percent | 86 | 94 |
| Tensile strength after 96 hours in water at 20° C., kp./cm.$^2$ | 64.00 | 48.10 |
| Wood torn out, percent | 77 | 92 |
| Tensile strength according to AW 100 (alternate boiling test), kp./cm.$^2$ | 53.40 | 43.07 |
| Wood torn out, percent | 72 | 84 |

EXAMPLE 6

A glue is prepared from 1 kg. of resin (I), 200 g. of coconut shell powder and 30 g. of hardener as described above; it is used for gluing small spruce boards with a thin glue joint (0.1 mm.). The open time is varied and the bond strength of the gluing and the wood torn out (which is a measure of the relative strengths of wood and glue joint) are determined. The results are given in Table 4.

TABLE 4

[Small spruce boards with a thin glue joint (0.1 mm.), cold gluing at 20° C. and 65% relative humidity and with varying open times]

| | Open time minutes | Strength, kp./cm.$^2$ | Wood torn out, percent |
|---|---|---|---|
| Dry | 15 | 37–83 | 100 |
| | 30 | 37.50 | 100 |
| | 45 | 33.00 | 100 |
| | 60 | 35–83 | 100 |
| | 75 | 26.33 | 100 |
| Mean | | 34.69 | 100 |
| Laid in water for 96 hours | 15 | 25.00 | 100 |
| | 30 | 33.33 | 93 |
| | 45 | 26.50 | 23 |
| | 60 | 28.83 | 100 |
| | 75 | 21.66 | 53 |
| Mean | | 27.06 | 74 |
| Alternate boiling test AW 100 | 15 | 31.00 | 55 |
| | 30 | 33.75 | 100 |
| | 45 | 24.87 | 83 |
| | 60 | 24.62 | 68 |
| | 75 | 18.25 | 95 |
| Mean | | 26.49 | 80 |

We claim:
1. A process for the production of an aminoplast wood adhesive composed of 1.7 to 3.0 mols of formaldehyde and 0.05 to 0.2 mol of a phenol per 1 mol of a mixture of melamine and urea, the molar ratio of melamine:urea in said mixture being from 15:85 to 10:18, which process comprises:
   condensing formaldehyde and urea in a 1.5 to 2.5 molar ratio in aqueous solution up to a water compatibility of from 0.5 to 10; and
   subsequently reacting the condensate at a pH of from 7.5 to 10 and at a temperature of 45° to 100° C. with melamine, phenol and up to 0.5 mols of formaldehyde, calculated with respect to the urea and melamine present, until the aqueous solution has a viscosity of from 300 to 2000 centipoises as measured at a solid content of 63% and at a temperature of 20° C.

2. A process for the production of an aminoplast wood adhesive composed of 1.7 to 3.0 mols of formaldehyde and 0.05 to 0.2 mol of a phenol per 1 mol of a mixture of melamine and urea, the molar ratio of melamine:urea in said mixture being from 15:85 to 10:18, which process comprises:

condensing urea and melamine in admixture, said mixture comprising at least 15% molar of melamine, with 1.5 to 2.5 mols of formaldehyde at a pH of 7.5 to 10 up to a water compatibility of from 0.5 to 10; and subsequently reacting the condensate at a pH of from 7.5 to 10 and at a temperature of 45° to 100° C. with melamine, phenol and up to 0.5 mil of formaldehyde, calculated with respect to the urea and melamine present, until the aqueous solution has a viscosity of from 300 to 2000 centipoises as measured at a solid content of 63% and at a temperature of 20° C.

3. A process as claimed in claim 1 wherein the melamine component is added as a precondensate of the formaldehyde in said reaction with phenol.

4. A process as claimed in claim 2 wherein the formaldehyde component is added in said reaction with phenol in an amount of 0.15 to 1.5 mols of formaldehyde per mol of phenol.

5. A process as claimed in claim 1 wherein formic acid is added as a hardener to the final product for gluing wood in the cold condition.

6. A process as claimed in claim 2 wherein formic acid is added as a hardener to the final product for gluing wood in the cold condition.

7. The wood adhesive obtained by the process of claim 1.

8. The wood adhesive obtained by the process of claim 2.

References Cited
UNITED STATES PATENTS

| | | | |
|---|---|---|---|
| 2,826,559 | 3/1958 | Updegraff | 260—51.5 |
| 3,036,028 | 5/1962 | Malashevitz | 260—839 |
| 3,321,551 | 5/1967 | Knutsson | 260—839 |
| 3,070,572 | 12/1962 | Oland et al. | 260—839 |
| 3,617,428 | 11/1971 | Carlson | 260—839 |

FOREIGN PATENTS

| | | | |
|---|---|---|---|
| 490,580 | 2/1953 | Canada | 260—839 |

JOHN C. BLEUTGE, Primary Examiner

U.S. Cl. X.R.

156—331, 335; 161—262; 260—51.5, 839, 840